United States Patent [19]

Bellows et al.

[11] Patent Number: 4,790,194
[45] Date of Patent: Dec. 13, 1988

[54] FLOW MEASUREMENT DEVICE

[75] Inventors: James C. Bellows, Maitland; Michael Twerdochlib, Oviedo, both of Fla.

[73] Assignee: Westinghouse Electric Corp., Pittsburgh, Pa.

[21] Appl. No.: 44,625

[22] Filed: May 1, 1987

[51] Int. Cl.⁴ .............................................. G01F 1/22
[52] U.S. Cl. ................................................ 73/861.53
[58] Field of Search ...................................... 73/861.53

[56] References Cited

U.S. PATENT DOCUMENTS

| | | | |
|---|---|---|---|
| 2,402,585 | 6/1946 | Allison | 73/861.53 |
| 2,606,445 | 8/1952 | Eckman | 73/861.53 |
| 3,795,145 | 3/1974 | Miller | 73/861.53 |
| 3,817,099 | 6/1974 | Bubniah | 73/861.53 |
| 4,193,301 | 3/1980 | Ferrentino | 73/861.53 |
| 4,325,169 | 3/1983 | Torresin | 73/861.53 |

Primary Examiner—Herbert Goldstein
Attorney, Agent, or Firm—D. C. Abeles

[57] ABSTRACT

Fluid flow is determined for a large flow pipe based upon differential pressure across an orifice in the pipe having a known cross-sectional area. In one form, the orifice is variable and adjusted in response to differential pressure so as to maintain differential pressure at a constant value. Flow is determined directly from orifice area. The orifice may be a part of a closed loop flow measurement system which responds to differential pressure changes to adjust orifice area. Various differential pressure settings may be used to accommodate selected back pressures in the flow pipe.

1 Claim, 1 Drawing Sheet

FLOW MEASUREMENT DEVICE

BACKGROUND OF THE INVENTION

1. Field of the Invention

This invention relates to flowmeters and, more particularly, to a flowmeter for accurate measurement of fluid flow rates which vary significantly over short periods of time. The invention is useful for monitoring changes in fluid flow through pipes generally.

2. Description of the Prior Art

In the past, various instruments have been designed to accurately measure fluid flow within limited ranges of flow rate. These devices include wet test meters, dry test meters, volumetric gas meters, hot wire flowmeters and rotameters. Such devices in combination may be used to monitor flow rates over many desirable ranges of measurement. However, a limiting feature of such prior designs sometimes arises when it is necessary to measure fluctuating flow rates which extend outside the dynamic range of a single instrument during brief time intervals. Circumstances which demonstrate the need for overcoming this limitation are illustrated by the prior efforts made to closely monitor exhaust air flows in steam turbine generating systems. Such systems are characterized by exhaust flow rates varying from 0 to 400 cubic feet per minute (CFM). The desirable range of flow rates in certain steam turbines during normal operating conditions is between one and ten CFM. The exhaust pipes in such systems are typically six inches in diameter and may be larger for long lengths of pipe in order to minimize back pressure which would otherwise occur during startup when the turbine system contains large quantities of air. This air discharge can result in initial exhaust rates on the order of 400 CFM. In the past flowmeters which have been used for measuring these exhaust rates have required a minimum fluid flow velocity through the measurement pipe of approximately 50 feet per minute in order to maintain an acceptable level of accuracy. However, the velocity of a 1 CFM flow through a six inch pipe is on the order of only five feet per minute. Consequently, one problem has been that of accurately measuring the exhaust flow in the desirable range during normal operating conditions without creating excessive back pressures during startup and other periods during which the exhaust air flow rate increases considerably beyond the desirable range of one to ten CFM.

A prior method which has been used to measure the exhaust air flow rate from a steam turbine is illustrated in FIG. 1. A valve V closes the exhaust pipe P and bypasses the exhaust air through a flowmeter F. The measurement tube T of the flowmeter has a markedly smaller inside diameter than the exhaust pipe, thus increasing the exhaust air flow velocity above the minimally acceptable velocity needed to measure the volumetric flow of the gas within an acceptable level of accuracy. A first feature of this bypass method which is believed to be disadvantageous is that the valve must completely seal the pipe in order to sustain accurate flowmeter measurements. Failure of the valve to create an adequate seal will result in spurious data. A second disadvantageous feature of this bypass method is that when the exhaust flow rate increases, e.g., due to a sudden leakage of air into the turbine system, the pipe valve must be opened in order to minimize back pressure. Thus, the bypass method is not useful for continuously monitoring the leakage of air into the turbine system by measuring the flow rate of air being pumped out of the system. However, it is desirable to continuously monitor such air leakage so that developing problems can be discerned early and corrected before significant damage is done to the system. Alternative solutions such as monitoring pressure fluctuations in the exhaust pipe require measurement sensitivity on the order of $3 \times 10^{-6}$ p.s.i. under ambient pressure conditions of fifteen to twenty p.s.i. Reliable instrumentation of suitable sensitivity has not heretofore been available to monitor the flow rates of gases over the entire range which is typical of steam turbine exhaust air pipes. Generally, it is believed that there is a need for a device which continuously monitors the flow rates of fluids which are characterized at times by relatively small flow velocities as a result of a relatively large pipe diameter, but which flow velocities may at times increase beyond 50 feet per minute.

SUMMARY OF THE INVENTION

Among the several objects of the present invention may be noted the provision of an improved flowmeter which overcomes the above discussed limitations or undesirable features, as well as others, of the prior art; the provisions of such improved flowmeter including a means of measuring flow rates over a dynamic range previously attainable with only multiple metering devices; the provisions of such improved flowmeter including the ability to monitor variable flow rates without producing significant back pressure in the fluid undergoing measurement; the provision of such an improved flowmeter which is capable of continuously monitoring gaseous and liquid flows so that sudden fluctuations in flow rate may be promptly detected; the provision of such a method for measuring flow rate which method adjusts fluid back pressure to be within an acceptable range in order to achieve accurate measurements; the provisions of such an improved method for measuring flow rates which includes a means for determining the volumetric flow rate of a fluid based on measured differential pressure across a measurement pipe; the provisions of such an improved method for measuring flow including a means for adjusting the area of cross-sectional flow through which measured fluid passes within a measurement pipe; and the provisions of such an improved flowmeter including a reliable means for monitoring flow rates at volume flow speeds as low as five feet per minute with an accuracy of at least 0.2 CFM.

In general, an improved flowmeter is provided in one form of the invention with an adjustable aperture for controlling fluid differential pressure across the aperture, the differential pressure being proportional to the volumetric flow rate of the fluid through the aperture. The inventive meter includes a pressure measurement device for continuously monitoring the pressure across the aperture. Further in general, a control system is disclosed comprising a measurement pipe having an aperture of adjustable diameter or cross-sectional area and an electro-mechanical control system which adjusts aperture diameter or cross-sectional area in order to monitor fluid flow while simultaneously controlling differential pressure across the aperture.

BRIEF DESCRIPTION OF THE DRAWING

For a better understanding of the present invention, reference may be had to the following detailed description taken in conjunction with the accompanying drawing in which.

DETAILED DESCRIPTION OF THE PREFERRED EMBODIMENT

Figure 2:
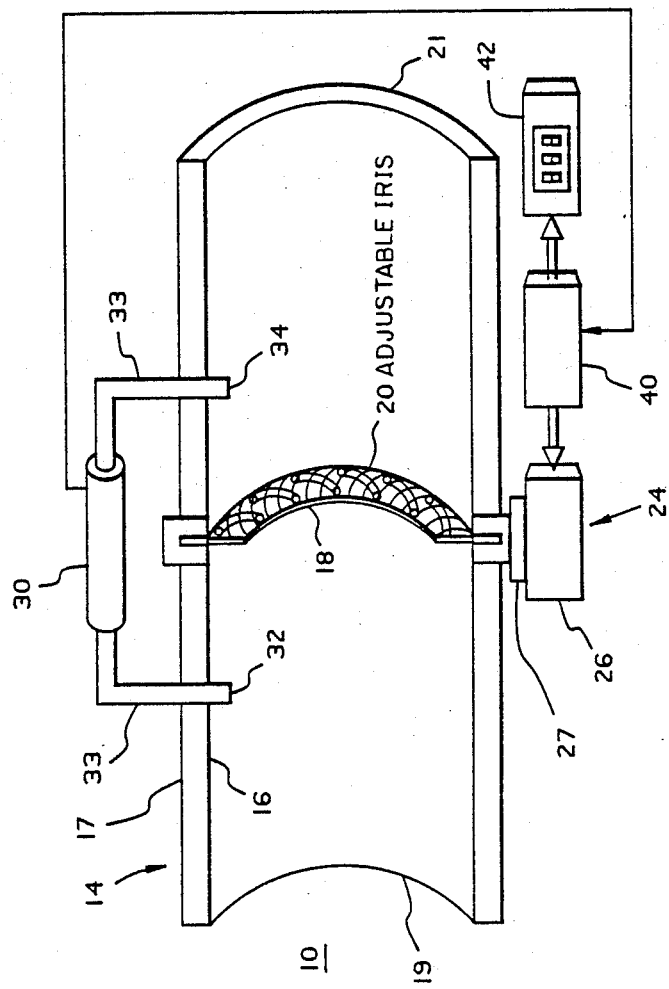
FIG. 2 is an illustrative embodiment of the present invention.

With reference to FIG. 2 there is illustrated a device for measuring the volumetric flow generally of a fluid passing through a pipe. The device has application to the measurement of exhaust air flows through large pipes, e.g., eight inches in diameter, with particular application to flow velocities varying from 0 to greater than 50 feet per minute. The device is believed to be of comparable utility for measuring volumetric flow of other types of fluids, including liquids.

Figure 1:
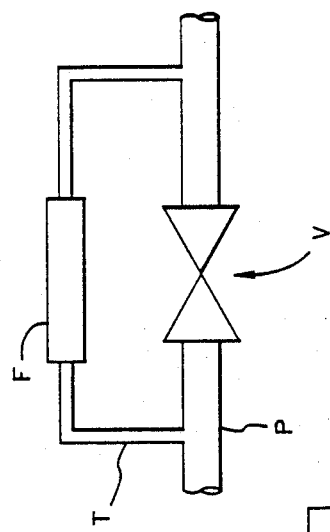
FIG. 1 is a prior art flow measuring system.

The inventive flowmeter 10 comprises a measurement pipe 14, shown in cross-section having an inner wall 16, an outer wall 17, a first end 19 and a second end 21, connectable to other pipes at the first and second ends for passing a fluid for which the rate of flow is to be determined. For example, the pipe 14 may be serially connected with the pipeline or exhaust pipe P of FIG. 1. Measurement pipe 14 includes an adjustable constriction or aperture 18 whose flow diameter or cross-sectional area may be controlled exterior to the measurement pipe. The inside diameter of measurement pipe 14 is preferably at least as large as the minimum inside diameter of pipeline P. It is to be understood that the cross-sectional area corresponding to aperture 18 may be enlarged to a size which provides no constriction to fluid flow through pipeline P.

In the preferred embodiment the means for adjusting or varying the diameter of aperture 18 comprises an adjustable iris 20 controlled by a motorized control system 24. Iris 20, based on well-known design principles such as those used for designing irises for cameras, comprises a plurality of plates which may be adjusted in order to vary the diameter or cross-sectional area of aperture 18. Depending on the physical and chemical environments into which it is placed, iris 20 may be formed from any of numerous materials including plastics and metals. In the preferred embodiment iris 20 is formed from stainless steel in order to counter the deteriorating effects of exhaust air flow. Other means suitable for controlling the effective cross-sectional area for fluid flow at a position along measurement pipe 14 are well known in the art. These include adjustable nozzles and flexible pipes. It is understood that measurement of volumetric flow rates in pipes having relatively small fluid flow velocities, e.g., in the range of 0 to 5 feet per minute, may be accomplished with aperture geometries which are not as critical to flow measurement as are the aperture geometries under higher flow velocity conditions. An alternative variable flow constriction means generally suitable for use in the inventive flowmeter comprises a Laval nozzle formed of resilient material in combination with a clamp or other constricting device for controlling the effective nozzle diameter. While more complex nozzle and aperture designs may be suitable to applicant's invention, such designs may not provide additional benefit until conditions of low fluid flow velocities.

Motorized control system 24 comprises motor drive 26 operatively coupled to iris 20 in order to effect changes in aperture diameter. Differential pressure transducer 30 provides an indication of the pressure drop of fluid flowing through aperture 18 as a result of the difference in cross-sectional flow area between measurement pipe 14 and aperture 18. Transducer 30 indicates the differential pressure across iris 20 by monitoring fluid pressure through orifices 32 and 34 located on opposite sides of iris 20 along the wall 16 of measurment pipe 14. The size and position of each orifice 32, 34 relative to iris 20 are determinable according to standard formulae and measurement techniques well-known in the art of measuring variables of compressible flow. Each orifice 32, 34 communicates to transducer 30 by conduits 33. Transducer 30 may be a differential pressure gage or may comprise separate measuring devices such as manometers for providing data representative of pressure across iris 20.

Differential pressure measuring devices such as may be used for transducer 30 are well known in the art. The transducer 30 provides continuous output signals representative of differential pressure across iris 20. These signals are received by microcomputer 40, which may be, for example, a commercially available processor such as a programmable controller or a personal computer. The microcomputer 40 comprises suitable memory for data storage and processing means for determining flow rates and appropriate control adjustments in order to vary the diameter of aperture 18. Preferrably microcomputer 40 includes both dynamic and static memory (RAM and ROM) for storing and retrieving variable and constants (data) used in computing flow.

The microcomputer 40 computes flow through pipe 14 based upon the relationship:

$$F = KA\sqrt{\Delta P}$$

where F represents flow rate, A is the cross-sectional area of aperture 18, $\Delta P$ is the differential pressure determined by transducer 30 and K is a constant related to the fluid dynamic parameters, which in this application are the dynamic parameters of air flow. While temperature and ambient pressure may affect K somewhat, the microcomputer 40 could also compensate for those variations.

For situations in which it is desirable to maintain a constant $\Delta P$ (differential pressure), microcomputer 40 provides signals to a motor controller or drive 26 for actuating motor 27 to adjust the opening of aperture 18. The mechanical construction of such a motor driven aperture is well known as is the electrical control of the motor 27. In some situations it may be desirable to have several different $\Delta P$ settings depending upon the flow rate, i.e., a $\Delta P$ setting for each of a plurality of ranges of flow. In those instances, the microcomputer 40 computes F and then selects a $\Delta P$ from, for example, a look-up table in the ROM memory in which there are stored $\Delta P$ values as a function of flow. The microcomputer 40 then adjusts the cross-sectional area A of aperture 18 to maintain the selected $\Delta P$. All of the parameters selected, utilized and computed by microcomputer 40 may be provided as viewable data to, for example, a digital display unit 42.

In summary, then, microcomputer 40 continuously monitors signals provided by transducer 30 in order to compute flow rates and effect changes in aperture diameter so that the differential pressure measured across iris 20 is kept within a desired range or set points. For a given cross-sectional area based on the effective diameter of aperture 18 and a measured or set differential pressure $\Delta P$, the fluid flow rate F may be calculatd from the approximate equation: $F=KA\sqrt{\Delta P}$. Thus, the flow rate is determined on the basis of measurement of differential pressure across at least one location (the adjustable aperture 18), the cross-sectional area of the one location being adjustable to establish a predetermined differential pressure based upon flow. Microcomputer 40 provides the calculated flow and other desirable parameters to digital read-out unit 42. Based on the monitored differential pressure $\Delta P$ and input criteria for the differential pressure, microcomputer 40 adjusts the differential pressure in compliance with the input criteria. Based on stored data, microcomputer 40 generates appropriate command signals causing motor drive 26 to make necessary adjustments in aperture diameter in order to maintain the differential pressure at the a desired value. Thus, when substantial control system 42 increases the diameter of aperture 18 in order to maintain the differential pressure across the aperture at a predetermined value while simultaneously utilizing both the differential pressure and the aperture diameter to compute volumetric flow consistant with accuracy and resolution requirements. As flow diminishes to levels typical of normal operating conditions aperture diameter may be decreased in order to improve the accuracy of flow rate computation while limiting the differential pressure to a maximum level defined by input criteria, i.e., settings for $\Delta P$ may be selected to provide a minimum differential pressure consistent with desired accuracy and resolution.

There has been described a novel device for measurement of fluid flow in a pipeline. The device is functional in pipes having relatively low flow velocities, e.g., less than 5 feet per minute, thus being applicable to pipelines having a large variety of diameters. It is contemplated that changes as to the precise arrangements, shapes and details of the invention as illustrated herein for purposes of disclosure, as well as the precise steps and order thereof in the inventive method, may be made by those having ordinary skill in the art without departing from the spirit of the invention or the scope thereof as defined by the claims which follow.

We claim:

1. An apparatus for continuously measuring fluid flow through a pipe in which the fluid flow varies over a range of about 0 to 400 cubic feet per minute comprising:

a measurement pipe having an inner wall, an outer wall, a first end, and a second end;

first and second measurement orifices each connecting the inner and outer walls, the first and second measurement orifices being spaced apart along the pipe, said measurement pipe being connectable to other pipes so that fluid which is to be monitored enter said measurement pipe through the first end and exits said measurement pipe through the second end;

an iris having an adjustable opening, said iris being placed across the inner wall or said pipe between the first and second orifices;

differential pressure means coupled to said first and second orifices for providing data representative of pressure therebetween;

mechanical means for adjusting the opening of said iris; and control means for controlling said mechanical means in order to develop differential pressrues between the first and second measurement orifices which are suitable for calculating rates of fluid flow through said measurement pipe, said control means including means for calculating rates of fluid flow through said measurement pipe, means responsive to said rates of fluid flow for selectively establishing a desired differential pressure value, and means for controlling said mechanical means for maintaining differential pressure at said selected desired value.

* * * * *